United States Patent
Katayama et al.

[11] Patent Number: 5,938,758
[45] Date of Patent: *Aug. 17, 1999

[54] MICROPROCESSOR HAVING FUNCTION OF PREFETCHING INSTRUCTION

[75] Inventors: Takao Katayama, Ikeda; Shinichi Yamaura, Kobe; Keiichi Yoshioka; Kazuhiko Hara, both of Sanda, all of Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/933,579

[22] Filed: Sep. 19, 1997

Related U.S. Application Data

[63] Continuation of application No. 08/363,601, Dec. 23, 1994, abandoned.

[30] Foreign Application Priority Data

Dec. 24, 1993 [JP] Japan ..................................... 5-327348

[51] Int. Cl.$^6$ .............................. G06F 13/32; G06F 13/00
[52] U.S. Cl. .......................... 712/207; 712/205; 710/260; 710/261
[58] Field of Search ..................................... 395/381–383, 395/872–875, 877–878, 880–881; 712/205–207, 237, 245; 711/137, 169, 204; 710/58, 260–261, 266

[56] References Cited

U.S. PATENT DOCUMENTS

| | | | |
|---|---|---|---|
| 4,298,927 | 11/1981 | Berglund et al. | 712/207 |
| 4,692,893 | 9/1987 | Casper | 710/55 |
| 4,719,570 | 1/1988 | Kawabe | 712/207 |
| 4,747,045 | 5/1988 | Harigai et al. | 712/207 |
| 5,148,532 | 9/1992 | Narita et al. | 712/245 |
| 5,287,483 | 2/1994 | Utsumi | 711/204 |
| 5,379,379 | 1/1995 | Becker et al. | 711/3 |
| 5,406,554 | 4/1995 | Parry | 370/381 |
| 5,524,270 | 6/1996 | Haess et al. | 710/128 |
| 5,586,295 | 12/1996 | Tran | 711/137 |
| 5,682,554 | 10/1997 | Harrell | 710/57 |

*Primary Examiner*—Zarni Maung
*Assistant Examiner*—Bharat Barot
*Attorney, Agent, or Firm*—Cooper & Dunham LLP

[57] ABSTRACT

A microprocessor having an instruction prefetch function includes a storage circuit in which an instruction externally supplied to the microprocessor via an external interface is stored, a first latch circuit which latches a write address value of the storage circuit in response to an interrupt signal externally supplied to the microprocessor, and an internal interrupt signal outputting circuit which compares a read address value of the storage circuit indicating the instruction stored in the storage circuit with the write address value supplied from the first latch circuit and which generates the internal interrupt signal only when the read address value and the write address value coincide with each other. The microprocessor processes an interrupt process in response to the internal interrupt signal.

9 Claims, 5 Drawing Sheets

FIG. 1A PRIOR ART  BUS CYCLE

FIG. 1B PRIOR ART  INTERRUPT SIGNAL

FIG.8(b) NMI

FIG.8(c) QCPLTN

FIG.8(d) QPFEN

FIG.8(e) ENMI

FIG.8(f) UENMI

MICROPROCESSOR HAVING FUNCTION OF PREFETCHING INSTRUCTION

This is a continuation of application Ser. No. 08/363,601 filed Dec. 23, 1994, now abandoned.

BACKGROUND OF THE INVENTION

1. Field of the Invention

The present invention generally relates to microprocessors, and more particularly to a microprocessor having the function of prefetching an instruction. 2. Description of Related Technology Nowadays, microprocessors are widely used in various electronic devices. Generally, a microprocessor has an interrupt function in which an interrupt process is generated when the microprocessor executes a predetermined address. This predetermined address is detected by an interrupt generating device located outside of the microprocessor, and an interrupt indication (signal) is applied to the microprocessor when the predetermined address is detected.

There is also known a microprocessor having the prefetch function in addition to the interrupt function. In such a microprocessor, the address at which the interrupt process is generated may not be executed. In this case, the interrupt occurs at an address which has not been actually executed.

The above event will now be described with reference to the following table.

| Address | Instruction | Operand |
|---------|-------------|---------|
| 1000    | mov         | r0, r1  |
| 1002    | add         | r2, r3  |
| 1004    | beq         | 1200    |
| 1006    | mov         | r3, r0  |
| 1008    | add         | r4, r5  |

The instruction stored at address #1006 may be executed due to the presence of a conditional branch instruction "beq (branch equal)" stored at address #1004 immediately preceding address #1006.

However, in the microprocessor having the prefetch function, the instruction that is stored at address #1006 and has not been actually executed is prefetched. In this case, there is a problem such that the interrupt signal is supplied to the microprocessor due to the address detection performed outside of the microprocessor, and the interrupt process takes place with respect to the address which has not been executed.

There is another problem, which will be described by referring to FIGS. 1A–1B. The external interrupt generating device detects the predetermined address and generates the interrupt signal. In this case, the interrupt does not occur in the same cycle as the address detection, but occurs with a one-cycle delay caused by a factor such as a delay in the interrupt generating device. For example a target cycle for interrupt is indicated at (a) and a cycle in which interrupt actually occurs is indicated at (b).

SUMMARY OF THE INVENTION

It is a general object of the present invention to provide a microprocessor having the instruction prefetch function in which the above problems are eliminated.

A more specific object of the present invention is to provide a microprocessor in which the interrupt does not occur with respect to an address which has not been actually executed and occurs in the target cycle.

These objects of the present invention are achieved by a microprocessor having an instruction prefetch function, said microprocessor comprising:

- a storage circuit in which an instruction externally supplied to the microprocessor via an external interface is stored;
- a first latch circuit which latches a write address value of the storage circuit in response to an interrupt signal externally supplied to the microprocessor; and
- an internal interrupt signal outputting circuit which compares a read address value of the storage circuit indicating the instruction stored in the storage circuit with the write address value supplied from the first latch circuit and which generates the internal interrupt signal only when the read address value and the write address value coincide with each other,
- the microprocessor processing an interrupt process in response to the internal interrupt signal.

The first latch circuit corresponds to a NAND circuit (51), a first flip-flop circuit (52), a second flip-flop circuit (53), a NAND circuit (56) and a latch circuit (26), which circuits will be described in detail later. The internal interrupt signal outputting circuit corresponds to a second comparator (27), a NAND circuit (58), a latch circuit (57) and an inverter (62), which circuits will be described in detail later.

BRIEF DESCRIPTION OF THE DRAWINGS

Other objects, features and advantages of the present invention will become more apparent from the following detailed description when read in conjunction with the accompanying drawings, in which:

FIGS. 8(a)–8(f) depict a timing chart of the operation of the microprocessor shown in FIG. 2.

DESCRIPTION OF THE PREFERRED EMBODIMENTS

Figures 1A, 1B, 2, 3:
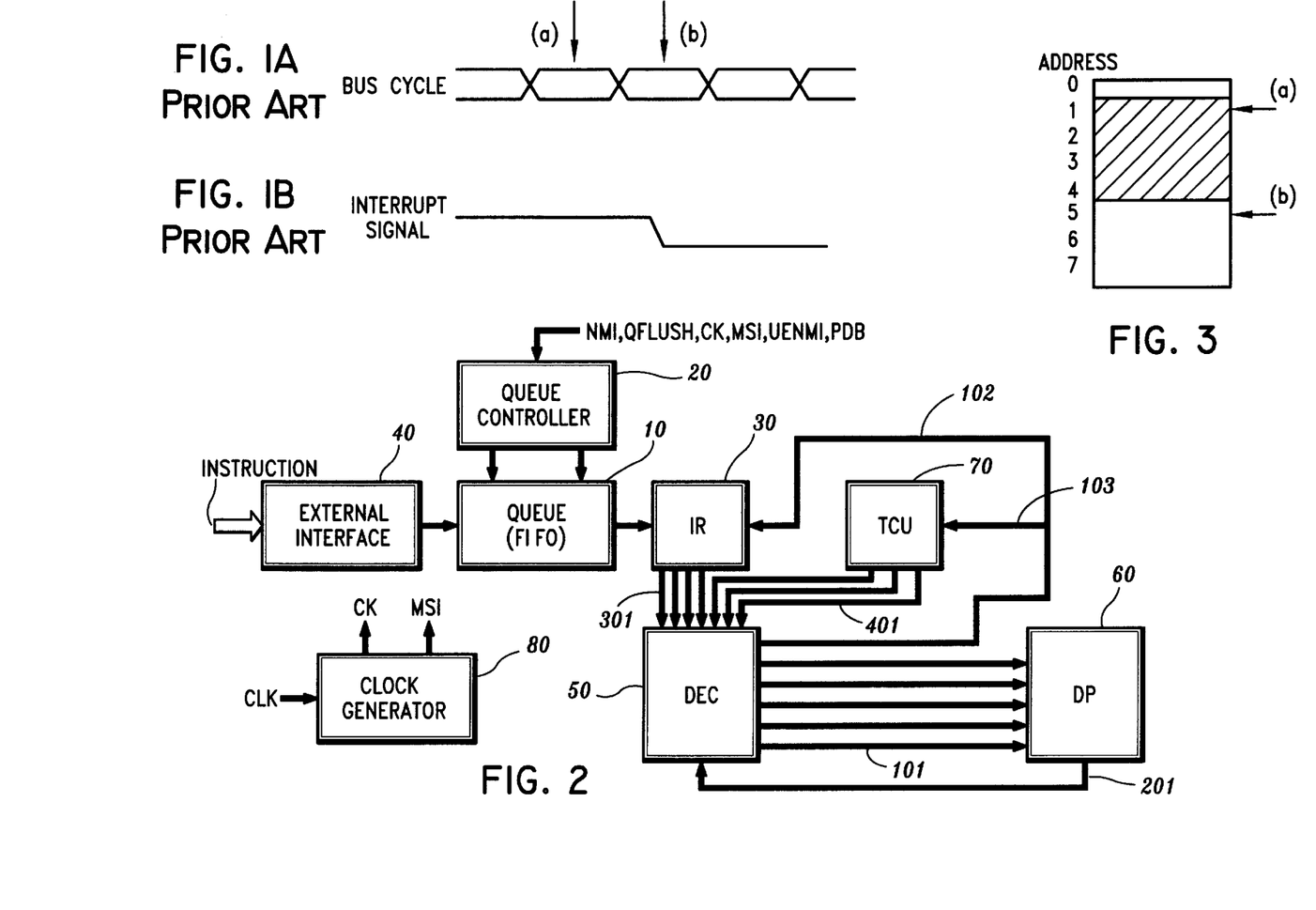
FIGS. 1A–1B are a timing chart of a disadvantage of a conventional microprocessor.
FIG. 2 is a block diagram of a microprocessor according to an embodiment of the present invention.
FIG. 3 is a block diagram showing the read and write operation of a queue buffer shown in FIG. 2.

FIG. 2 is a block diagram of a microprocessor having the prefetch function according to an embodiment of the present invention. The microprocessor shown in FIG. 2 includes a queue buffer 10, a queue controller 20, an instruction register 30, an external interface 40, a decoder (DEC) 50, an execution unit (also referred to as a data path: DP) 60, a timing control unit (TCU) 70, and a clock generator 80.

The queue buffer 10 receives instructions from an external device via the external interface 40. The queue controller 20 controls the operation of the queue buffer 10.

FIG. 3 shows the write/read operation of the queue buffer 10 under the control of the queue controller 20. Indicated at point (a) in FIG. 3 is a pointer indicating instruction sent to instruction register next time (read pointer). Indicated at point (b) in FIG. 3 is a pointer indicating instruction written via external interface next time (write pointer). Instructions received via the external interface 40 are sequentially written into the queue buffer 10 from address #0 to address #7. The queue address of the queue buffer 10 specifying a storage area into which an instruction is to be written, is indicated by a write pointer which will be described later. The queue address of the queue buffer 10 specifying a storage area from which the instruction is to be read, is indicated by a read pointer which will be described later.

Figure 5:
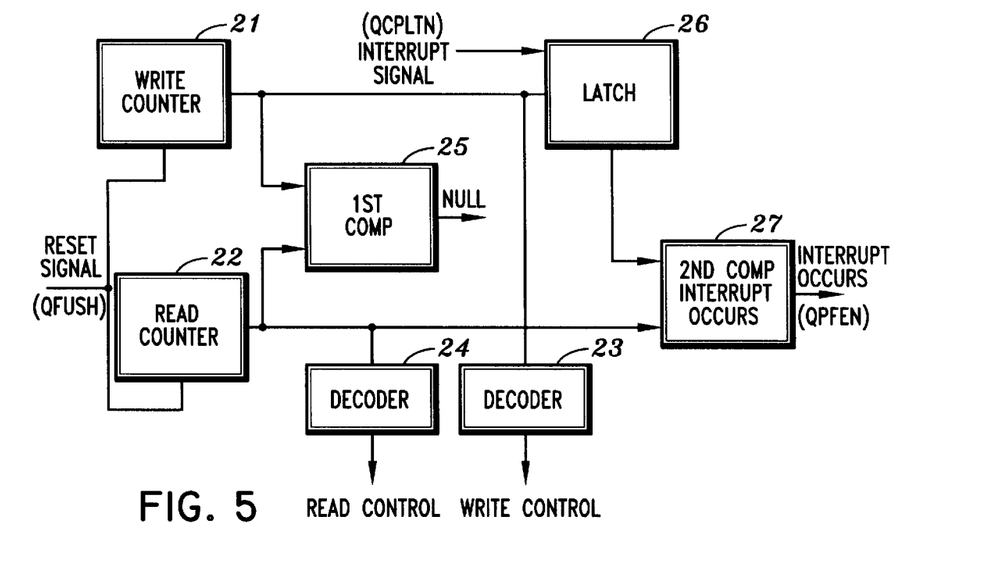
FIG. 5 is a block diagram of a circuit provided in a queue controller shown in FIG. 2.
Figure 6:
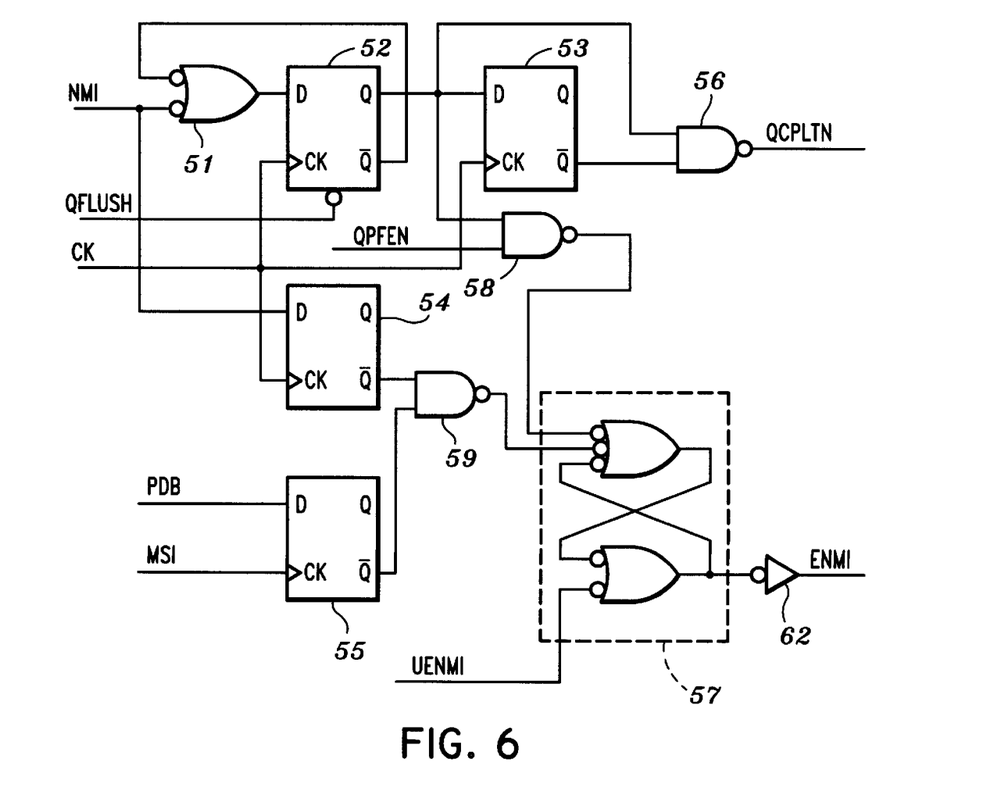
FIG. 6 is a block diagram of another circuit provided in the queue controller shown in FIG. 2.

The queue controller 20 has circuits as shown in FIGS. 5 and 6, which will be described in detail later. The queue controller 20 receives an external interrupt signal NMI, a reset signal QFLUSH, a clock signal CK, a machine cycle signal MS1, an unable signal UENMI and an access area indication signal PDB. The queue controller 20 finally outputs an internal interrupt signal ENMI to the queue buffer 10. The external interrupt signal NMI is an interrupt request signal supplied to the microprocessor when the predetermined address of an interrupt request instruction is detected outside of the microprocessor. The internal interrupt signal ENMI is a signal that requests the process of the external interrupt signal NMI to the sequence control of the microprocessor.

The decoder 50 is the main control part of the microprocessor and has input terminals connected to the output terminals of the instruction register 30 and the timing control unit 70. The output terminals of the decoder 50 are connected to the input terminals of the execution unit 60, the instruction register 30 and the timing control unit 70. The execution unit 60 executes operations on data and temporarily stores data.

The decoder 50 is supplied with information of an instruction code (coded instruction) from the instruction register 30 and information of the execution step from the timing control unit 70. Then, the decoder 50 refers to a microprogram provided therein, and sends control signals 101 to the execution unit 60, a control signal 102 to the instruction register 30 and a control signal 103 to the timing control unit 70.

The timing control unit 70 controls the execution steps of the instruction. The decoder 50 is notified of the execution steps by means of timing signals 401. The timing control unit 70 sets the first execution step of an instruction to "0" and then performs the sequential counting operation.

The clock generator 80 receives an external clock CLK and generates therefrom the clock signal CK and the machine cycle signal.

Figure 4:
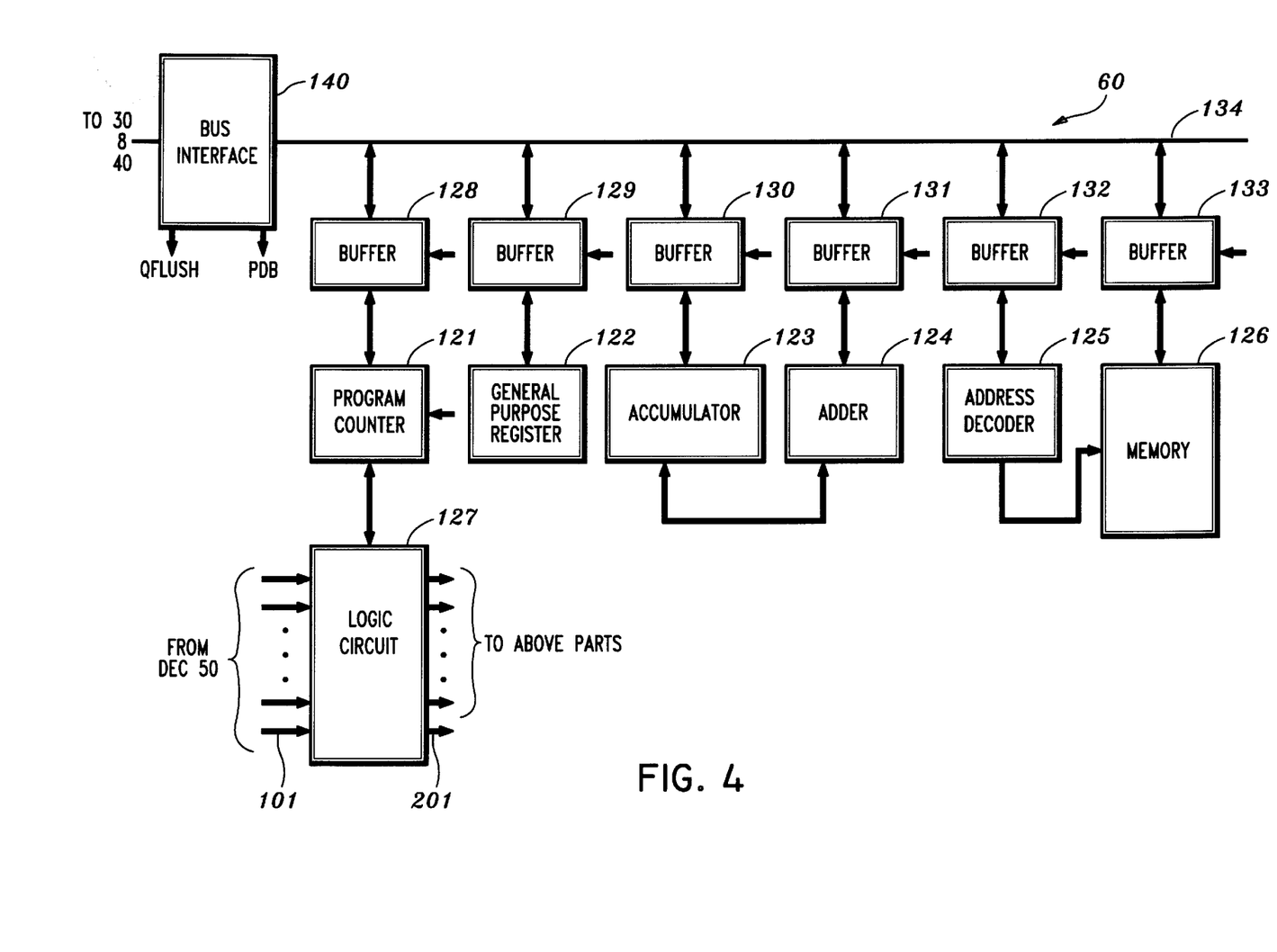
FIG. 4 is a block diagram of an example of the execution unit shown in FIG. 2.

FIG. 4 is a block diagram of an example of the structure of the execution unit 60, as seen in FIG. 2. As shown in FIG. 4, the execution unit 60 includes a program counter 121, a general-purpose register 122, an accumulator 123, an adder 124, an address decoder 125, a memory 126, a logic circuit 127 and a bus interface 140. Further, the execution unit 60 includes buffers 128–133 respectively connected to the elements 121–126, which are coupled to a data bus 134 via the buffers 128–133. The data bus 134 is coupled to the instruction register 30 shown in FIG. 2. The logic circuit receives the control signals 101 from the decoder 50 shown in FIG. 2, and generates therefrom internal control signals including a monitor signal 201 for monitoring predetermined data (bit or bits) processed in the execution unit 60.

The logic circuit 127 generates the monitor signal 201 by referring to the counter value of the program counter 121.

The internal control signals are supplied to the buffers 128–133 and the program counter 121. The program counter 121 performs the count operation in synchronism with the control signal (timing signal) from the logic circuit 127. The control signals 101 show various decoded instructions such as inputting data to the accumulator 123, inputting data to the register 122, storing data in the memory 126 and adding data. In response to these decoded instructions, the logic circuit 127 produces corresponding control (timing) signals. The bus interface establishes the interface between the bus 134 and the circuits 30 and 40, and generates the signals QFLUSH and PDB. Data and address can be transferred between a corresponding part of the external interface 40 and the internal data bus 134. The instructions can be transferred to the instruction registers 30 via the instruction register 30.

As has been described previously, the queue controller 20 has the circuits shown in FIGS. 5 and 6.

Referring to FIG. 5, the queue controller 20 includes a write counter 21, a read counter 22, a decoder 23, a decoder 24, a first comparator 25, a latch circuit 26 and a second comparator 27. The write counter 21 functions as a write pointer, and produces the write address (write pointer value). The instruction supplied to the queue buffer 10 is written therein according to the write address output by the write counter 21. The read counter 22 functions as a read pointer, and produces the read address (read pointer value). The instruction specified by the read address is read from the queue buffer 10. The decoder 23 connected to the output side of the write counter 21 decodes the write address output by the write counter 21, and produces therefrom a write control signal. The decoder 24 connected to the output side of the read counter 22 decodes the read address output by the read counter 22, and produces therefrom a read control signal.

The first comparator 25, connected to the output sides of the write counter 21 and the read counter 22, compares the write pointer value with the read pointer value. Then the write pointer value is equal to the read pointer value, the first comparator 25 produces a null signal NULL. The latch circuit 26 connected to the output side of the write counter 21 latches the write pointer value (write address) in response to an interrupt signal QCPLTN, which will be described later. The second comparator 27 is connected to the output sides of the latch circuit 26 and the read counter 22, and compares the latched write pointer value and the read pointer value (read address) with each other. When the latched write pointer value and the read pointer value are equal to each other, the second comparator 27 produces an interrupt signal QPFEN.

The queue controller 20 further includes the circuit shown in FIG. 6, which functions as an interrupt control circuit. This interrupt control circuit includes a NOR circuit 51, D-type flip-flop circuits 52–55, a NAND circuit 56, a latch circuit 57, NAND circuits 58 and 59, and an inverter 62. The interrupt control circuit shown in FIG. 6 generates, from the external interrupt signal NMI, the reset signal QFLUSH, the clock signal CK, the machine cycle signal MS1, the signal UENMI and the access area indication signal PDB, the interrupt signal QCPLTN for making the counter value of the write counter 21 latched in the latch circuit 26. Finally, the interrupt control circuit outputs the internal interrupt signal ENMI to the inner circuit of the microprocessor.

The data output terminal of the first flip-flop circuit 52 is connected to the data input terminal of the second flip-flop circuit 53, and is supplied with the external interrupt signal NMI via the NOR circuit 51. The first flip-flop circuit 53 outputs a predetermined output signal to the second flip-flop circuit 53 in synchronism with the clock signal CK, which is externally supplied or internally produced. The first flip-flop circuit 52 is reset by the reset signal QFLUSH. As will be described later, the reset signal QFLUSH is switched to the low level when a branch instruction is executed. The reset signal QFLUSH is supplied from, for example, the decoder 50. The data output terminal of the second flip-flop circuit 53 is connected to the NAND circuit 56, which produces the interrupt signal QCPLTN. That is, the interrupt signal QCPLTN is controlled mainly by the external interrupt signal NMI, the clock signal CK and the reset signal QFLUSH.

The external interrupt signal NMI is supplied to the data input terminal of the third flip-flop circuit 54, which outputs a predetermined output signal to the latch circuit 57 in synchronism with the clock signal CK. The access area indication signal PDB is supplied to the data input terminal of the fourth flip-flop circuit 55, which outputs a predetermined output signal to the latch circuit 57 in synchronism with the machine cycle signal MS1 functioning as a clock. The access area indication signal PDB is supplied via the external interface 40 shown in FIG. 2.

The latch circuit 57 is connected to the NAND circuit 58 supplied with the interrupt signal QPFEN and the signal UENMI. The signal UENMI is used to cancel the signal NMI supplied externally. More particularly, when an interrupt having priority over the signal NMI occurs inside the processor, the signal UENMI prevents the signal NMI from being accepted. The latch circuit 57 outputs the internal interrupt signal ENMI via the inverter 62.

Figure 7:
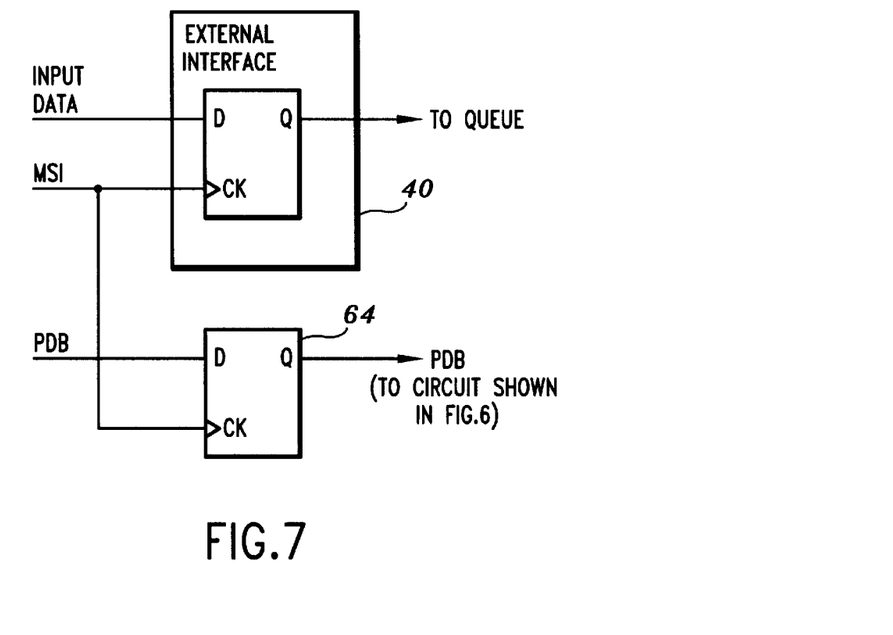
FIG. 7 is a block diagram of an external interface and its peripheral circuit shown in FIG. 2.

As shown in FIG. 7, the external interface 40 can be formed of a flip-flop circuit operating in synchronism with the machine cycle signal MS1 defining the machine cycle. In this case, the access area indication signal PDB is output via a flip-flop circuit 64 operating in synchronism with the machine cycle CLK. The output terminal of the flip-flop circuit 64 is connected to the input terminal of the fourth flip-flop circuit 55 shown in FIG. 6.

A description will now be given of the operation of the microprocessor with reference to FIG. 8. As shown in part (b) of FIG. 8, in a case where the external interruption signal NMI supplied to the microprocessor from an external circuit is low when the clock signal CK switches to the high level, the NAND circuit 51, the first flip-flop circuit 52, the second flip-flop circuit 53 and the NAND circuit 56 maintain the interrupt signal QCPLTN at the low level until the clock signal CK rises to the high level next time, as shown in part (c) of FIG. 8. The interrupt signal QCPLTN thus produced is sent to the latch circuit 26 shown in FIG. 5, which latches the count value of the write counter 21 in response to the switching of the interrupt signal QCPLTN to the low level. In this way, the latch circuit 26 latches the write pointer value obtained at the time when the external interrupt signal NMI switches to the low level.

The second comparator 27 compares the write pointer value latched in the latch circuit 26 with the read pointer value output by the read counter 22. When these pointer values are the same as each other, that is, when the address value of the instruction having the interrupt request coincides with the address value of the instruction supplied to the instruction register 30 from the queue buffer 10, the second comparator 27 interrupt signal QPFEN switched to the high level, as shown in part (d) of FIG. 8. The interrupt signal QPFEN thus produced is supplied to the NAND circuit 58 of the interrupt control circuit shown in FIG. 6.

The reset signal QFLUSH supplied to the first flip-flop circuit 52 from, for example, the decoder 50, is switched to the low level when an branch instruction is executed. The inverted output signal that is output via the inverted output terminal (Q bar) of the first flip-flop circuit 52 resets the first flip-flop circuit 52 maintaining the external interrupt signal NMI, so that the external interrupt signal NMI can be canceled. Further, the reset signal QFLUSH resets the write counter 21 and the read counter 22, so that the instructions prefetched in the queue buffer 10 are deleted and hence the queue buffer 10 is initialized to have no instructions (the queue buffer 10 becomes null).

As described above, in the microprocessor according to the embodiment of the present invention, in the case where the interrupt request occurs from the external circuit, the count value of the write counter 21 is latched by the latch circuit 26 in response to the interrupt signal QCPLTN output from the interrupt control circuit shown in FIG. 6. The latched write counter value is compared, by the second comparator 27, with the read pointer value indicated by the read counter 22. The interrupt process is executed only when the write counter value (write pointer value) coincides with the read pointer value.

The third flip-flop circuit 54, the fourth flip-flop circuit 55 receiving the access area indication signal PDB, and the NAND circuit 59 causes the interrupt signal ENMI oriented to the inner circuit of the microprocessor to be controlled by the interrupt signals QCPLTN and QPFEN and the signal UENMI returning the interrupt signal ENMI to the low level, as shown in parts (e) and (f) of FIG. 8. Hence, the interrupt condition can be changed by the access area indication signal PDB.

Figure 9A:
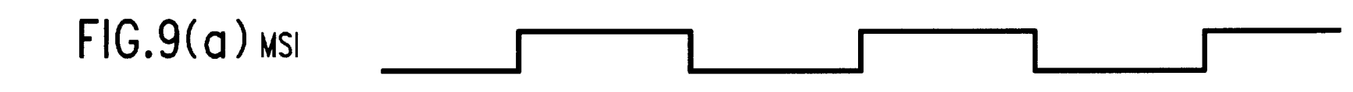
FIGS. 9(a)–9(f) depict another timing chart of the operation of the microprocessor shown in FIG. 2.
Figure 9B:
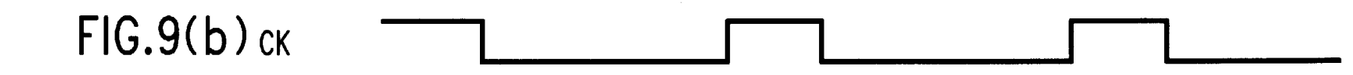
Figure 9C:
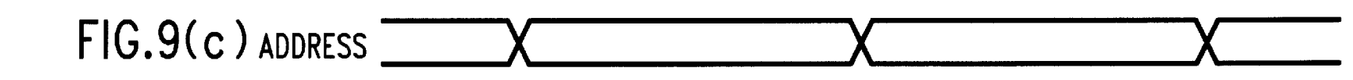
Figure 9D:
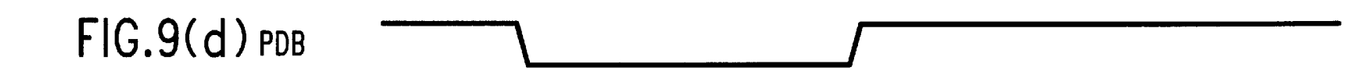

The access area indication signal PDB indicates whether the cycle being executed by the microprocessor relates to a data area of an external memory coupled to the external interface (40) or a program area thereof. As shown in part (d) of FIG. 9, the access area indication signal PDB switches in synchronism with the rising edge of the machine cycle signal MS1 shown in part (a) of FIG. 9. When the access area indication signal PDB is low, the microprocessor accesses a data area. When the access area indication signal PDB is high, the microprocessor accesses a program area.

Figure 8A:
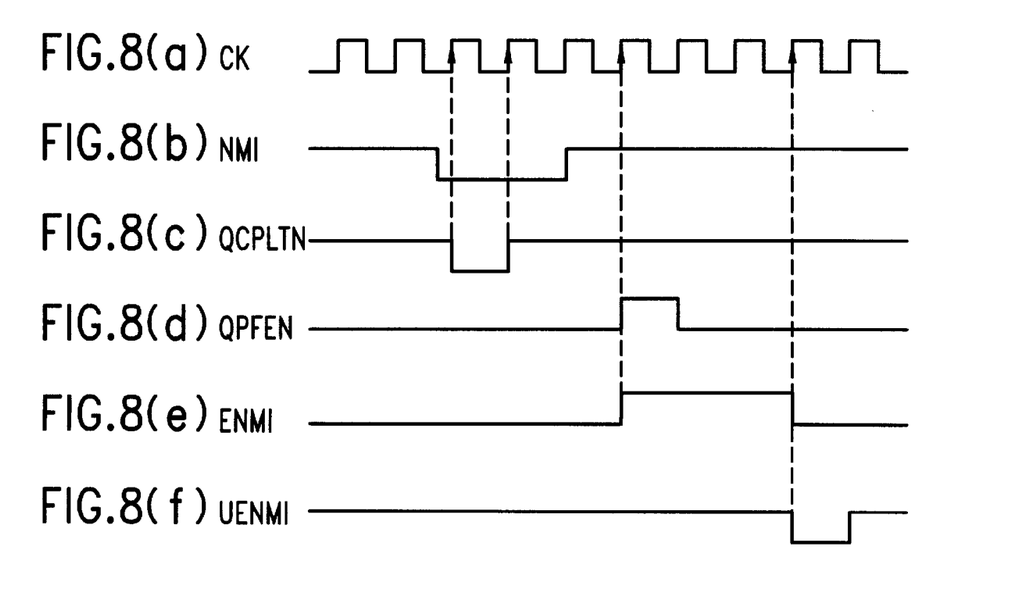

Hence, as has been described previously, the NAND circuit 58 is supplied with the high-level interrupt signal QPFEN. When the high-level of the interrupt signal QPFEN is detected in synchronism with the rising edge of the clock signal CK as shown in part (e) of FIG. 8, the internal interrupt signal ENMI is switched to the low level to the high level, so that an interrupt to the inner part of the microprocessor occurs. The internal interrupt signal ENMI is returned to the high level from the low level when the low-level UENMI signal is detected in synchronism with the rising edge of the clock signal CK, as shown in parts (a), (e) and (f) of FIG. 8.

Figure 9E:
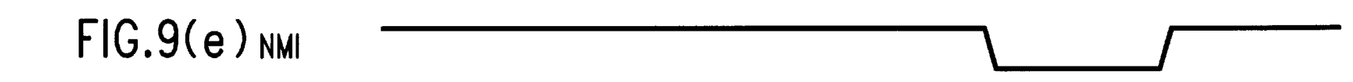

The external interrupt signal NMI is generated by the external device connected to the system bus when it detects the predetermined state of the microprocessor, for example, the address. The external device detects the address shown in part (c) of FIG. 9 and switches the external interrupt signal NMI to the low level, as shown in part (e) of FIG. 9. At this time, the flip-flop circuit 55 shown in FIG. 6 latches the access area indication signal PDB in synchronism with the rising edge of the machine cycle signal MS1. Then the NAND circuit 59 allows the occurrence of the internal interrupt signal ENMI with respect to the output data of the flip-flop circuit 54.

When the access area indication signal PDB is low and the external interrupt signal NMI is low, the inverted output (Q bar) of the flip-flop circuit 54 is 1 and the inverted output (Q bar) of the flip-flop circuit 55 is 1. Hence, the output of the NAND circuit 59 is switched to 0. Then, the output of the latch circuit 57 is 0 and the internal interrupt signal ENMI becomes high. In this way, the internal interrupt signal ENMI is generated.

When the access area indication signal PDB is high, the NAND circuit 59 inhibits occurrence of the internal interrupt signal ENMI associated with the external interrupt signal NMI. Hence, the detection of the external interrupt signal NMI in the prefetch, that is, only occurrence of the internal interrupt signal ENMI becomes valid.

Figure 9F:
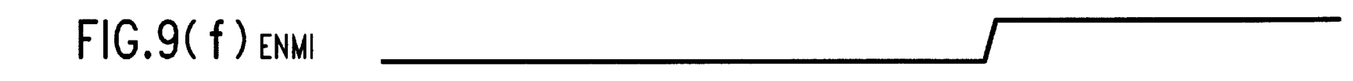

As described above, the third flip-flop circuit 54, the fourth flip-flop circuit 55 and the NAND circuit 59 enables the following operation. As shown in parts (e) and (f) of FIG. 9, in the case where the microprocessor is handling the data area, that is, the access area indication signal PDB is low, the internal interrupt signal ENMI switches to the high level when the external interrupt signal NMI switches to the low level. Hence, in this case, the internal interrupt signal ENMI is controlled by only the external interrupt signal NMI. The interrupt process can be executed in the state in which the cycle being executed by the microprocessor is accessing the data area of the external memory. This is because the interrupt process does not relate to the instructions in the queue buffer 10. The above process is accomplished by the third flip-flop circuit 54, the fourth flip-flop circuit 55 and the NAND circuit 59, which circuits handles the interrupt process applied to the circuit shown in FIG. 6.

When the structure shown in FIG. 7 is employed, the instruction externally supplied to the microprocessor is latched by the clock signal of the bus cycle and is output to the queue buffer 10. The supplied instruction is latched in synchronism with the rising edge of the clock signal next to the above bus cycle. The access area indication signal PDB to be supplied to the interrupt control circuit 40 is latched in response to the clock signal in the bus cycle in which the instruction is latched in the queue buffer 10. Hence, even if the interrupt signal is delayed by one machine cycle, the above-mentioned interrupt control can be performed.

According to the present invention, the internal interrupt signal is output only when the write address value and the read address value coincide with each other, that is, only when there is no instruction in the queue buffer, in other words, only when the address of an instruction to be actually executed by the microprocessor is supplied. Hence, it is possible to execute the interrupt by an instruction following the instruction by which execution of the interrupt is requested and to hence execute the interrupt process without any influence of the prefetch.

Further, it is possible to generate the internal interrupt signal on the basis of the address area indication signal irrespective of whether the read address value and the write address value coincide with each other.

The present invention is not limited to the specifically disclosed embodiments, and various variations and modifications may be made without departing from the scope of the present invention.

What is claimed is:

1. A microprocessor having an instruction prefetch function, said microprocessor comprising:
    a storage circuit in which an instruction externally supplied to the microprocessor via an external interface is stored;
    a write counter for generating and outputting at least part of a write address value used for accessing the storage circuit;
    a first latch circuit which latches the output of the write counter including the at least part of the write address value used for accessing the storage circuit generated by said write counter in response to an interrupt signal externally supplied to the microprocessor; and
    an internal interrupt signal outputting circuit which compares a read address value of the storage circuit generated at least in part by a read counter and representing the instruction stored in the storage circuit with the at least part of the write address value supplied from the first latch circuit and which generates the internal interrupt signal only when the read address value and the write address value coincide with each other,
    the microprocessor processing an interrupt process in response to the internal interrupt signal.

2. The microprocessor as claimed in claim 1, further comprising an access area indication signal outputting circuit which is supplied with an access area indication signal indicating whether a cycle being executed is accessing a data area of a memory or a program area of the memory and which outputs a predetermined output signal associated with the access area indication signal to the internal interrupt signal outputting circuit,
    wherein the internal interrupt signal outputting circuit outputs the internal interrupt signal in response to said predetermined signal irrespective of whether or not the read address value and the write address value coincide with each other.

3. The microprocessor as claimed in claim 2, wherein said external interface comprises:
    a second latch circuit which latches the instruction in synchronism with a clock signal supplied thereto and then outputs the instruction to the storage circuit; and
    a third latch circuit which latches the access area indication signal in synchronism with said clock signal and then outputs the access area indication signal to the access area indication signal outputting circuit, so that the internal interrupt signal can be produced without any delay.

4. A microprocessor having an instruction prefetch function, said microprocessor comprising:
    storage means for storing an instruction externally supplied to the microprocessor via an external interface;
    write counter means for generating and outputting at least part of a write address value used for accessing said storage means;
    first latch means for latching the output of the write counter including the at least part of the write address value used for accessing the storage means generated by said write counter means in response to an interrupt signal externally supplied to the microprocessor; and
    internal interrupt signal outputting means for comparing a read address value of the storage means generated at least in part by read counter means and representing the instruction stored in the storage means with the at least part of the write address value supplied from the first latch means and which generates the internal interrupt signal only when the read address value and the write address value coincide with each other,
    the microprocessor processing an interrupt process in response to the internal interrupt signal.

5. The microprocessor as claimed in claim 4, further comprising an access area indication signal outputting means which is supplied with an access area indication signal indicating whether a cycle being executed is accessing a data area of memory means or a program area of the memory means and which outputs a predetermined output signal associated with the access area indication signal to the internal interrupt signal outputting means, wherein the internal interrupt signal outputting means outputs the internal interrupt signal in response to said predetermined signal irrespective of whether or not the read address value and the write address value coincide with each other.

6. The microprocessor as claimed in claim 5, wherein said external interface comprises:

second latch means for latching the instruction in synchronism with a clock signal supplied thereto and outputting the instruction to the storage means; and third latch means for latching the access area indication signal in synchronism with said clock signal and outputting the access area indication signal to the access area indication signal outputting means, so that the internal interrupt signal can be produced without any delay.

7. A method for performing an instruction prefetch function, said method comprising:

storing in a storage circuit an externally supplied instruction supplied via an external interface;

generating and outputting at least part of a write address value used for accessing the storage circuit;

a first latching step for latching the output of the generating step including the at least part of the write address value used for accessing the storage circuit in response to an externally supplied interrupt signal; and comparing a read address value of the storage circuit generated at least in part by a read counter and representing the instruction stored in the storage circuit with the at least part of the write address value latched during the first latching step and generating the internal interrupt signal only when the read address value and the write address value coincide with each other, and processing an interrupt process in response to the internal interrupt signal.

8. The method as claimed in claim 7, further comprising supplying an access area indication signal indicating whether a cycle being executed is accessing a data area of memory or a program area of memory and outputting a predetermined output signal associated with the access area indication signal for use in the comparing step, wherein the internal interrupt signal outputting step outputs the internal interrupt signal in response to the predetermined signal irrespective of whether or not the read address value and the write address value coincide with each other.

9. The method as claimed in claim 8, further comprising:

a second latching step for latching the instruction in synchronism with a clock signal and outputting the instruction to the storage circuit; and a third latching step for latching the access area indication signal in synchronism with the clock signal and then outputting the access area indication signal for use during the access area indication signal outputting step, so that the internal interrupt signal can be produced without any delay.

* * * * *